Sept. 17, 1929.   O. BECKER   1,728,717
SUSPENSION INSULATOR
Filed June 9, 1924
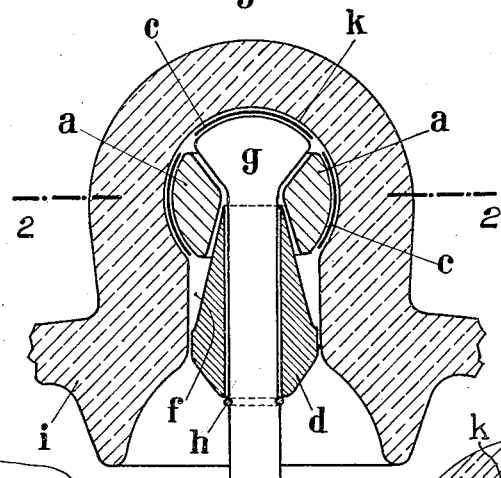
Fig. 1.
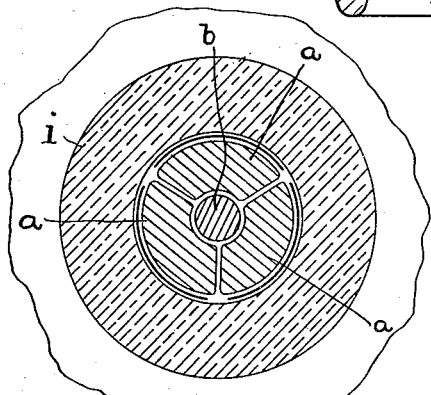
Fig. 2.
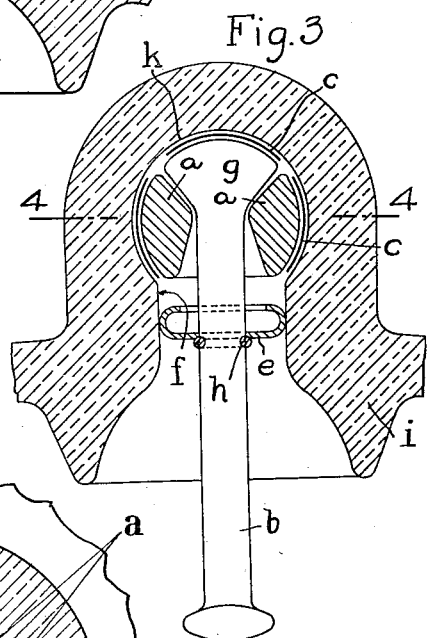
Fig. 3.
Fig. 4
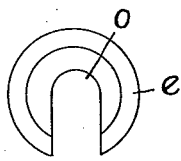
Fig. 5
Inventor:
O. Becker
By Marks & Clerk
Attys.

Patented Sept. 17, 1929

1,728,717

UNITED STATES PATENT OFFICE

OTTO BECKER, OF BERLIN-HENNIGSDORF, GERMANY, ASSIGNOR TO PORZELLAN-FABRIK PH. ROSENTHAL & CO. A.-G., OF BERLIN, GERMANY

SUSPENSION INSULATOR

Application filed June 9, 1924, Serial No. 718,962, and in Germany March 2, 1923.

I have filed applications in Germany, March 2, 1923, and in Italy, April 28, 1924, and in Austria, March 22, 1924, and in Czechoslovakia, March 26, 1924.

This invention relates to suspension insulators of the cap and bolt type, in which the cap is connected to the body of the insulator in any suitable manner with or without cement and relates more particularly to the manner of connecting the bolt to the body of the insulator, a bolt with an enlarged head being used, the said head being capable of being pushed into the bolt hole through the entrance opening.

It has already been proposed to connect such a bolt to the body of the insulator by means of intermediate members having a spherical outer surface, this intermediate member being preliminarily baked and introduced into the bolt hole, whereupon it was fired together with the insulator body.

The present invention also has for its object to provide a ball and socket connection between the bolt and the insulator body, but so that the inconvenience of making the insulator and the intermediate member in two operations by a preliminary baking and a subsequent firing is avoided. The insulator is fired in a single operation and the intermediate members are also made by themselves in a single operation, when made of porcelain. This provides not only the advantage, that the usual method of manufacture may be retained, but the further advantage, that it becomes possible to ascertain before building up the insulator, whether the bolt hole has turned out correctly and whether the intermediate members, if made of porcelain, may not have been damaged or deformed to any appreciable extent during the firing. Any deformation would cause the pressure to be unevenly distributed. Intermediate members of any other material may be used, for instance low grade burnt ceramic material or metal.

The invention consists in this, that between the bolt, the head of which is wider than the shank, but is capable of being inserted through the neck of the bolt hole, and the spherical part of the bolt hole an intermediate member consisting of a plurality of parts is inserted, the outer surface of which constitutes a portion of a sphere, having a diameter, which is preferably somewhat smaller than the diameter of the spherical part of the bolt hole. The intermediate members are held in their operative position by separate retaining members, which are fixed to the bolt. The retaining member is preferably made in two or more parts which are held together by a split ring or the like. The retaining member may also be used for holding the bolt in the bolt hole in such a position that it cannot rock in the bolt hole or can do so only to a small extent, whereby the bolt is prevented from assuming such an inclination that the intermediate members might fall out again.

In a modified form of the invention the bolt may be provided with an ordinary unexpanded head and the head may be formed by upsetting the bolt after it has been inserted into the bolt hole and after the insertion of the intermediate members.

In the accompanying drawings

Fig. 1 is a vertical section through a suspension insulator constructed according to the invention, Fig. 2 is a horizontal section on line 2—2 of Fig. 1, Fig. 3 is a vertical section through another constructional form and Fig. 4 a horizontal section on line 4—4 of Fig. 3.

In all the figures $i$ is an insulator of any form having an opening $f$ for inserting the bolt $b$ and the intermediate members $a$. The bolt hole is spherically enlarged at $k$ in a known manner. The bolt $b$ has an enlarged head $g$. After being inserted into the bolt hole, the bolt is held obliquely, so that it touches the side of the hole $f$ and one of the parts of the intermediate member $a$, which, in this case consists of three parts, is introduced. By the bolt being held obliquely, sufficient space is left for the insertion of such a part. After the part of the intermediate member, the outer surface of which forms part of a sphere having a slightly smaller diameter than the spherical surface $k$, has been pushed right home, the bolt is placed in another oblique position, the intermediate part already inserted turning with the bolt in the spherical part of the bolt hole. This provides space for the insertion of the second part of the intermediate member $a$. After it has been inserted, the third part is placed in position in the same way. After all three parts have been inserted, the bolt is swung into its normal position, in which its axis coincides with the axis of symmetry of the insulator. With the bolt in this position the intermediate parts cannot fall out, as they are thicker than the space between the bolt and the neck of the bolt hole.

The intermediate member may of course consist of four or five parts. It is not necessary for all the parts of the intermediate member to be exactly alike, but they must together form a complete intermediate member.

In order that there may be no difficulty in introducing the last part of the intermediate member, the vertical cross-section of the parts should preferably be such that they do not closely embrace the shank of the bolt, but leave a free space $z$ (Fig. 3). This space is bounded by the cylindrical surface of the bolt and a conical surface of the intermediate member.

In order to prevent the parts of the intermediate member falling out, which might occur, on the bolt leaving its symmetrical normal position, when the chain swings or during the transport, retaining members are provided for the bolt.

In the constructional example shown in Fig. 1 this retaining member $d$ is made in two parts and has a cylindrical surface facing the bolt and an outer cylindrical surface fitting the neck $f$ of the bolt hole and finally a conical outer surface or the like, which corresponds to the form of the inner surface of the intermediate member and engages between the intermediate member and the bolt. The retaining member $d$ consisting of two or more parts, is inserted as soon as the bolt and the intermediate member $a$ are in the normal position. The part $d$ is kept in position by a split ring or other fixing member $h$, which is for instance fixed in a groove in the bolt. In the constructional example shown in Fig. 3 this retaining member consists of a sheet metal ring $e$ in one piece (shown in plan in Fig. 5), which is slid with its lateral opening $o$ onto the bolt $b$ and is thereupon slid upwards into the bolt hole $f$, where it is kept in the position shown or a higher position by a fixing member $h$. This device also keeps the bolt in its central position in the bolt hole and prevents the parts of the intermediate member $a$ from falling out.

As was stated above, the head $g$ on the bolt $b$ may be formed after the parts of the intermediate member have been inserted. In this case an intermediate member consisting of two or more parts may be used, which need not leave a free space $z$, but may rest with its longitudinal surface against the bolt. First of all the parts of the intermediate member are inserted and thereupon the bolt having a cylindrical unexpanded head, after which the latter is formed during the introduction of the bolt, for instance by the bolt head being in a glowing state, when inserted, and being expanded by the application of pressure, so that the form of head shown in the figure is again obtained.

Retaining members $d$, $e$ may be used, but are not absolutely necessary.

The intermediate members $a$ may be made of any material. Preferably one or more layers $c$ of elastic material, for instance leather, compressed cloth or the like are introduced between the intermediate member and the bolt head and the bolt hole. When the head of the bolt is only formed within the insulator, the insertion around the bolt head is preferably made entirely or partially of asbestos.

What I claim is:

1. An insulator comprising an insulator body having a spherical aperture therein, a one-piece bolt having an enlarged conical shaped head, the upper outer surface being spherical, a plurality of intermediate members having a spherical outer surface and an inner tapered seat conforming to the conical surface of the enlarged part of said bolt, said members being inserted between said bolt and said insulator body when said bolt is displaced from its normal position, and means for holding said bolt in its normal position.

2. An insulator comprising an insulator body having a spherical aperture therein, a one-piece bolt having an enlarged conical shaped head, a plurality of intermediate members having a spherical outer surface and an inner tapered seat conforming to the conical surface of the enlarged part of said bolt, said members being inserted between said bolt and said insulator body when said bolt is displaced from its normal position, and means for holding said bolt in its normal position.

OTTO BECKER.